(12) United States Patent  
Morrow (10) Patent No.: US 8,888,057 B2  
(45) Date of Patent: *Nov. 18, 2014

(54) SUPPORT STAND

(71) Applicant: Morrow Sports, LLC, Bellvue, CO (US)

(72) Inventor: William David Morrow, Bellvue, CO (US)

(73) Assignee: Morrow Sports, LLC, Bellvue, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/871,668

(22) Filed: Apr. 26, 2013

(65) Prior Publication Data

US 2013/0233982 A1    Sep. 12, 2013

Related U.S. Application Data

(63) Continuation of application No. 13/136,214, filed on Jul. 25, 2011, now Pat. No. 8,444,097.

(51) Int. Cl.
    *F16M 11/20* (2006.01)
    *F16M 11/00* (2006.01)
    *F16M 11/24* (2006.01)
    *F16M 11/38* (2006.01)

(52) U.S. Cl.
    CPC ............. *F16M 11/00* (2013.01); *F16M 11/245* (2013.01); *F16M 11/38* (2013.01); *A47B 2200/0032* (2013.01)
    USPC ........... 248/164; 248/165; 248/150; 248/431; 248/346.3

(58) Field of Classification Search
    USPC ........ 248/157, 127, 121, 122.1, 125.8, 125.9, 248/146, 150, 163.1, 166, 176.1, 176.3, 248/188.1, 188.6, 188.8, 274.1, 309.1, 248/346.01, 346.03, 346.3, 165, 149, 164, 248/431, 170, 171; 220/476, 475, 478, 480, 220/628, 630, 668, 9.2, 9.3, 9.4; 211/71.01, 211/77, 85, 85.21, 133.1, 132.2, 189, 195; 473/451, 454, 351; 273/398, 400
    See application file for complete search history.

(56) References Cited

U.S. PATENT DOCUMENTS

| | | |
|---|---|---|
| 4,064,993 A | 12/1977 | Getner |
| 5,467,680 A | 11/1995 | Kurosaki |
| 5,746,406 A | 5/1998 | Dicke et al. |
| 5,876,091 A * | 3/1999 | Chernomashentsev ...... 297/16.2 |
| 6,047,931 A | 4/2000 | Flanagan et al. |
| 6,517,036 B1 * | 2/2003 | Ramirez, Jr. .................. 248/150 |
| 6,634,704 B1 * | 10/2003 | Bergquist ..................... 297/16.2 |
| 6,710,236 B2 | 3/2004 | Takegawa |
| 6,776,379 B2 | 8/2004 | Sherer et al. |
| 6,814,333 B1 | 11/2004 | Freiburger |
| 6,871,905 B2 | 3/2005 | Grace |
| 7,287,730 B1 | 10/2007 | Chen |
| 7,293,748 B1 | 11/2007 | Hoser |
| D566,985 S * | 4/2008 | Hana .............................. D6/403 |
| 7,628,433 B2 | 12/2009 | Schwartz |
| 7,703,725 B2 | 4/2010 | May |
| 8,066,119 B2 | 11/2011 | Doman |

(Continued)

*Primary Examiner* — Todd M Epps  
(74) *Attorney, Agent, or Firm* — Craig R. Miles; CR Miles, P.C.

(57) ABSTRACT

Generally a collapsible structure adapted to support a container. Specifically, a collapsible tripod which operates between a folded condition for transport and a support condition adapted to support a container.

16 Claims, 5 Drawing Sheets

(56) References Cited

U.S. PATENT DOCUMENTS

| | | | |
|---|---|---|---|
| 8,444,097 B2* | 5/2013 | Morrow | 248/164 |
| 2004/0011930 A1 | 1/2004 | Tuohy, III et al. | |
| 2004/0066064 A1 | 4/2004 | Neely et al. | |
| 2005/0051682 A1 | 3/2005 | Tuohy et al. | |
| 2008/0169389 A1 | 7/2008 | Hill | |
| 2013/0026313 A1 | 1/2013 | Morrow | |

* cited by examiner

SUPPORT STAND

This United States Patent Application is a continuation of U.S. patent application Ser. No. 13/136,214, filed Jul. 25, 2011, hereby incorporated by reference herein.

I. FIELD OF THE INVENTION

Generally a collapsible structure adapted to support a container. Specifically, a collapsible tripod which operates between a folded condition for transport and a support condition adapted to support a container.

II. BACKGROUND OF THE INVENTION

Conventional portable collapsible supports used to support containers take constructional forms that may be less than ideal.

One substantial problem with conventional collapsible supports used to support containers may be that the container secured in fixed relation to the collapsible support and may require disassembly of a portion of the collapsible support to remove the container as described for example in United States Patent Publication 2005/0051682 of Tuohy et al.

Another substantial problem with conventional collapsible supports may be that the legs do not include the elements which support the container inserted between them but may be provided as separate cross bars as described for example in U.S. Pat. No. 6,517,036.

Another substantial problem with conventional collapsible supports may be that the legs and support elements have a configuration with dimensional relations that receives one size of container as described for example in U.S. Pat. No. 6,517,036.

Another substantial problem with conventional collapsible supports may be that the insertion of a container within the legs of the support does not draw the legs against the external wall of the container to stabilize the container.

III. SUMMARY OF THE INVENTION

Accordingly one object of embodiments of the invention can be to provide a collapsible support which has a folded condition and a supporting condition which removably receives a container in the supporting condition without securing the container in fixed relation to the support stand.

Another object of embodiments of the invention can be to provide a collapsible support having support members which include in one piece the support elements which supportingly engage a container.

Another object of embodiments of the invention can be to provide a collapsible support having top portions of the support members which spread inwardly and outwardly to engage a plurality of containers having different external dimensional relations.

Another object of embodiments of the invention can be to provide a collapsible support having a restraint element which engages the external surface of a container to draw the support members inwardly against the external surface of the container.

Naturally, further objects of the invention are disclosed throughout other areas of the specification, drawings, photographs, and claims.

V. DETAILED DESCRIPTION OF THE INVENTION

Figure 1:
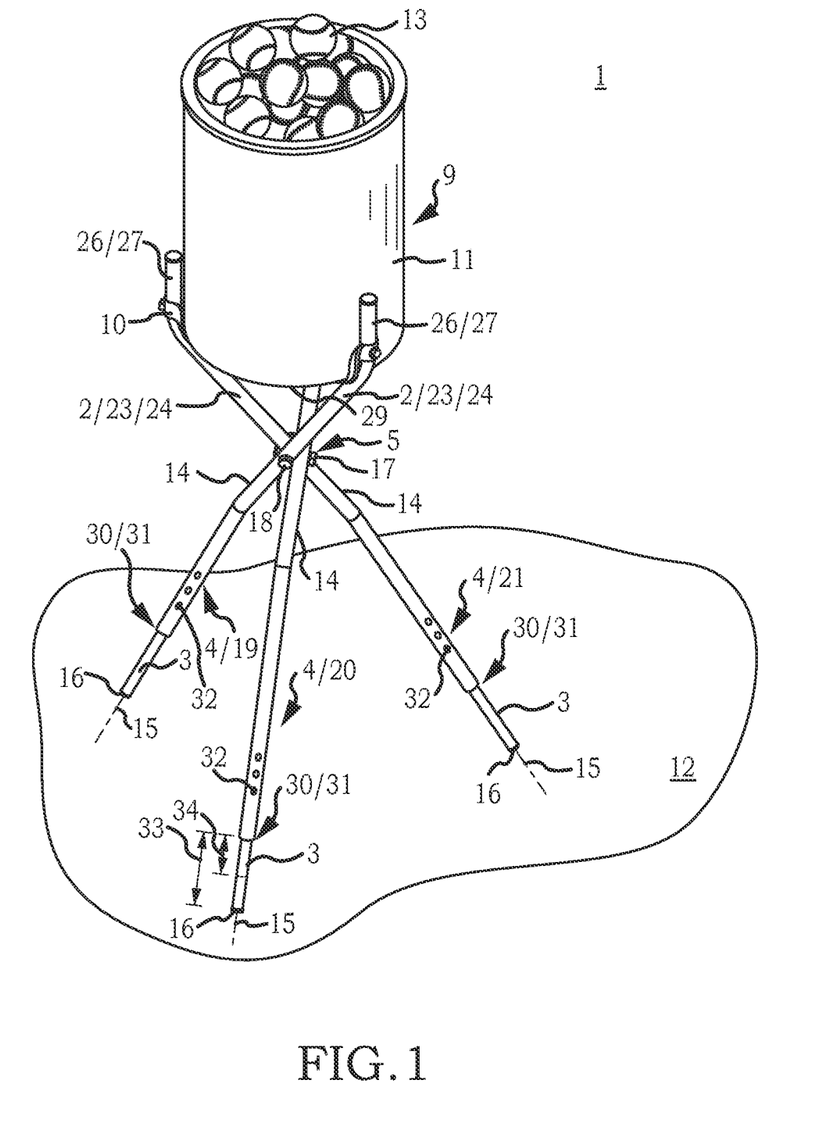
FIG. 1 is a perspective view of an embodiment of the support stand supporting a container.
Figure 2:
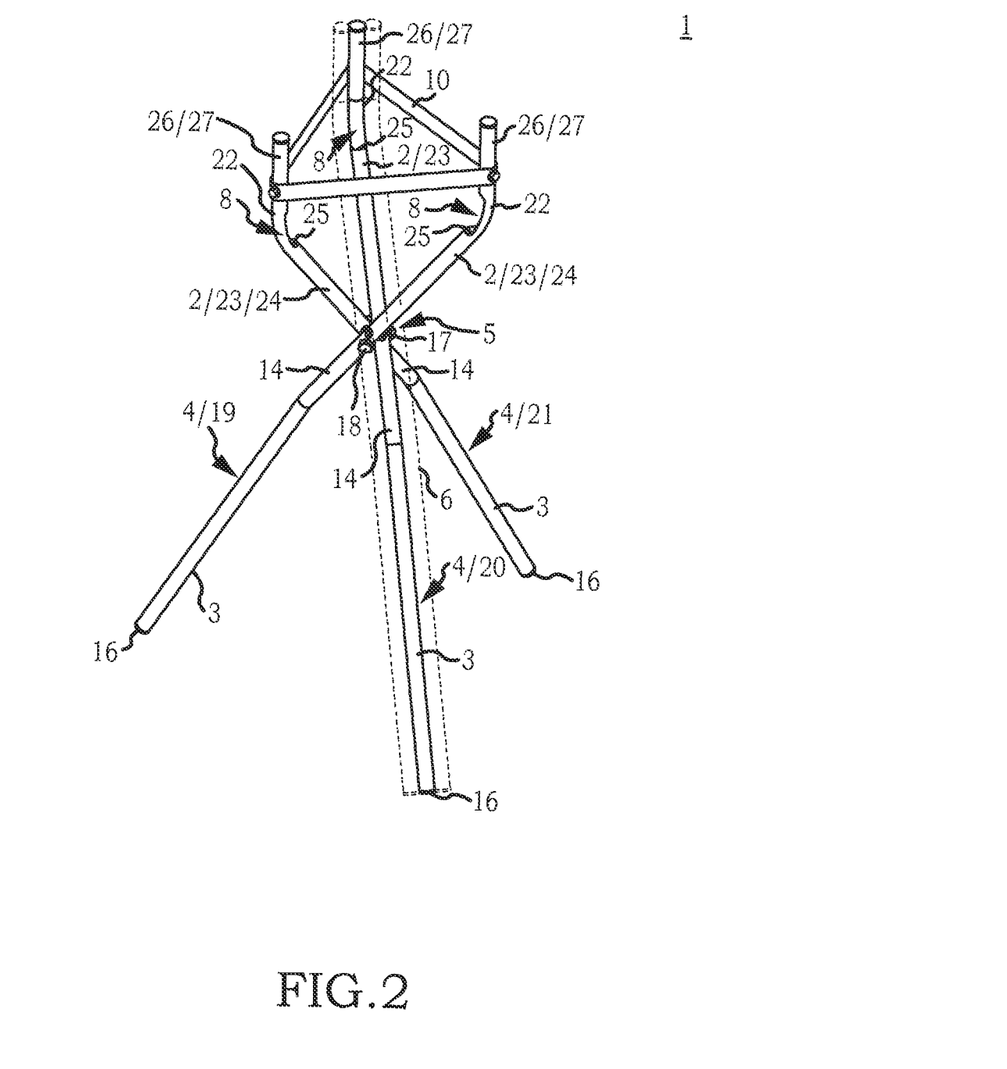
FIG. 2 is a perspective view of an embodiment of the support stand having a corresponding plurality of top portions and corresponding plurality of bottom portions of a plurality of support members spread into the supporting condition.
Figure 3:
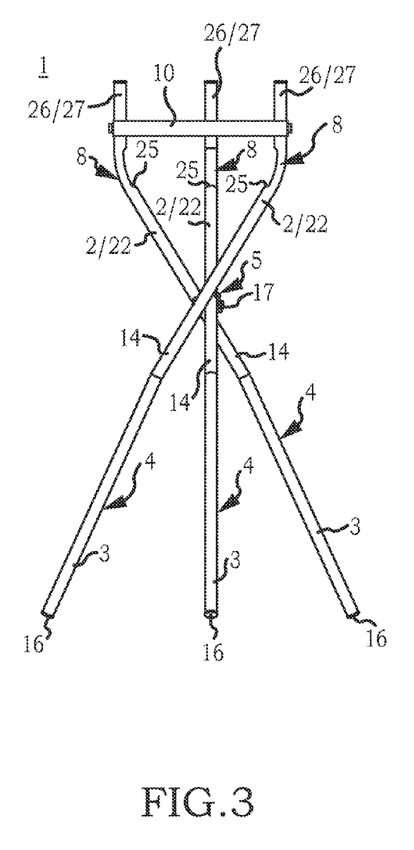
FIG. 3 is a first side view of an embodiment of the support stand.
Figure 4:
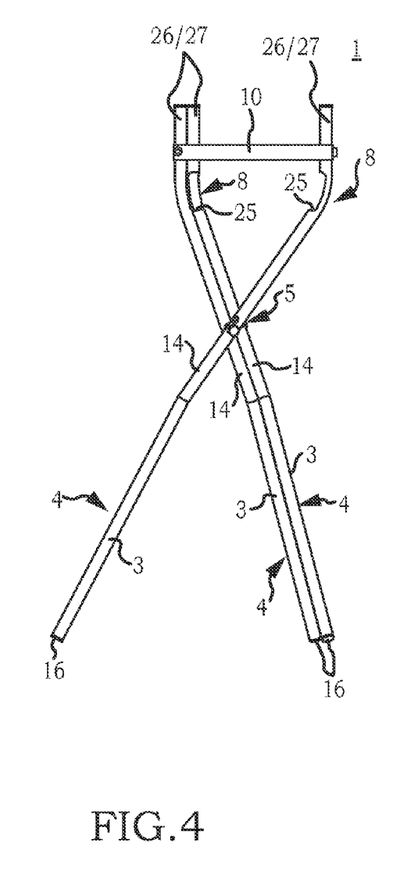
FIG. 4 is a second side view of an embodiment of the support stand.
Figure 5:
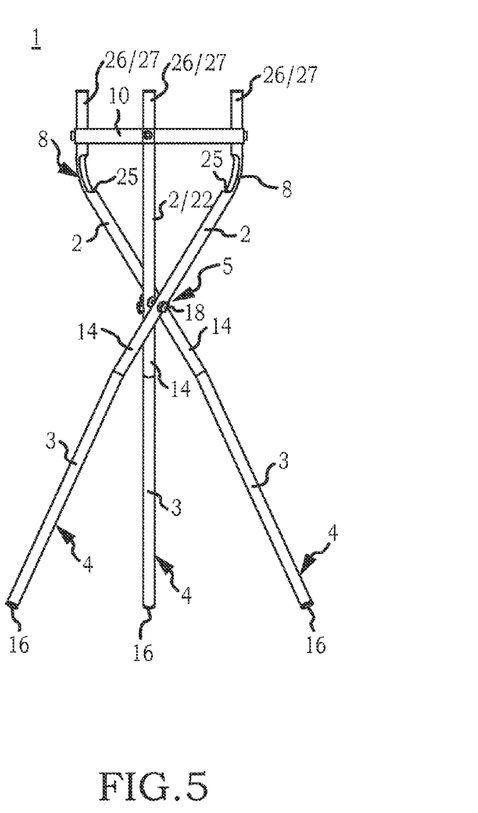
FIG. 5 is a third side view of an embodiment of the support stand.
Figure 6:
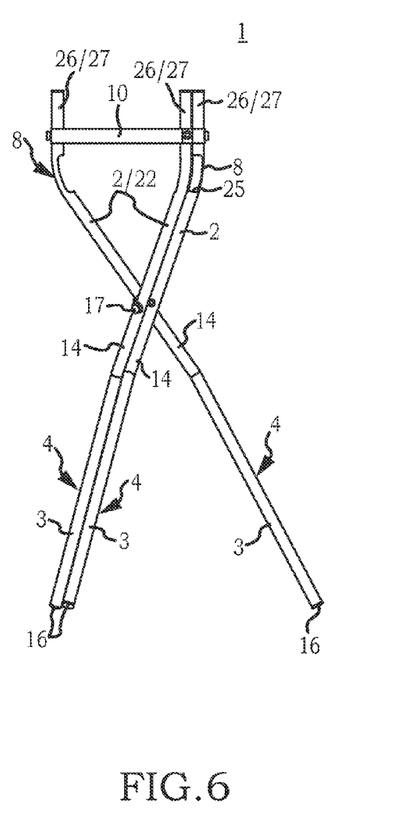
FIG. 6 is a fourth side view of an embodiment of the support stand.
Figure 7:
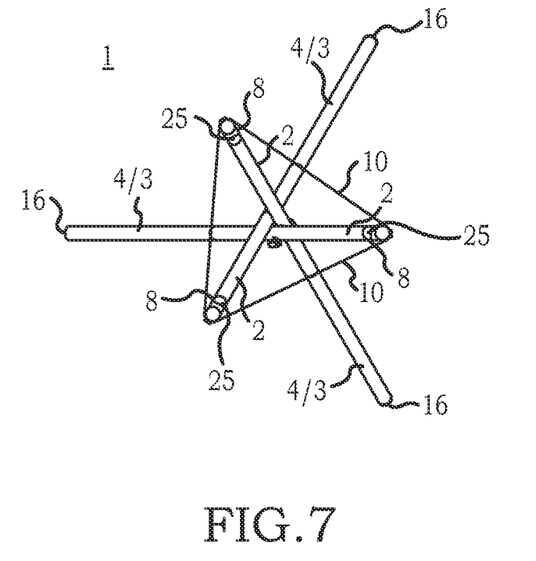
FIG. 7 is top view of an embodiment of the support stand.
Figure 8:
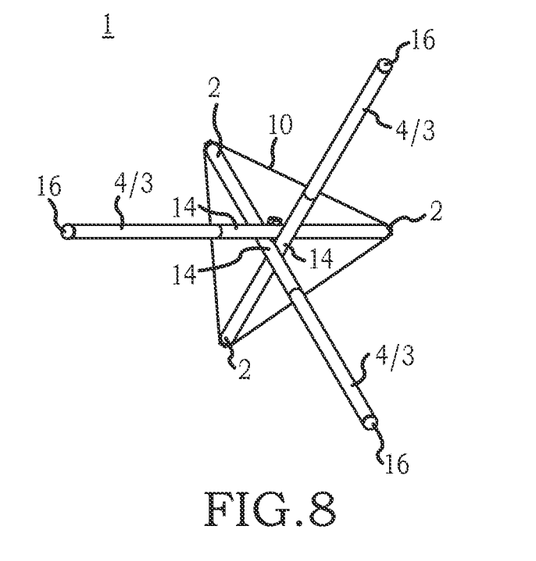
FIG. 8 is top view of an embodiment of the support stand.

Now referring primarily to FIGS. 1 and 2, which illustrates a method of using a particular embodiment of an inventive collapsible support stand (1). In a first step, a plurality of top portions (2) and a plurality bottom portions (3) of a plurality of support members (4) can be spread apart by rotating the plurality top portions (2) about a support member pivot (5). Spreading the plurality of top portions (2) and the plurality bottom portions (3) of said plurality of support members (4) allows the collapsible support (1) to be transformed from a folded condition (6) (shown in broken lines) into a supporting condition (7) in which a plurality of support elements (8) corresponding disposed one each in the plurality top portions (2) inwardly face a sufficient distance apart to receive a container (9). Spreading of the plurality of top portions (2) and the plurality of bottom portions (3) beyond the supporting condition (7) can be prevented by a restraint element (10) coupled about the plurality of top portions (2). The container (9) can be located inside of the plurality of top portions (2) to engage each of the plurality of support elements (8). By engaging each of the plurality of support elements (8), the container (9) can be supported by the collapsible support stand (1) in the supporting condition (7). As to those embodiments of the inventive collapsible support stand (1) which provide a restraint element (10) coupled about the plurality of top portions (2) (as shown in the non-limiting embodiment of FIG. 2), the container (9) can engage the restraint element (10) prior to engagement with the plurality of support elements (8) thereby drawing the plurality of top portions (2) sufficiently inward to forcibly engage an external surface (11) of the container (9). The corresponding plurality of ends (16) of the plurality of bottom portions (3) can be engaged with a support surface (12). By adjusting length of each of the plurality of bottom portions (3), the container (9) can be positioned at different heights in relation to the support surface (12). One or more objects (13) can be placed inside of the container (9).

Again referring primarily to FIGS. 1 and 2, the container (9) can be disengaged from the plurality of support elements (8) allowing the plurality of top portions (2) and the plurality of bottom portions (3) of the plurality of support members (4) to be rotated about the support member pivot (5) to collapse the support stand (1) to the folded condition (6).

It is to be understood that the method above-described is illustrative of a numerous and wide variety of methods which may be performed using a corresponding numerous and varied embodiments of inventive collapsible support stand (1) and that various different methods can be performed which include one or more of the steps above-described whether or not in the same or in a different serial order.

Now referring primarily to FIGS. 1 through 8, particular embodiments of the inventive collapsible support stand (1) can include a plurality of support members (4) having a corresponding plurality of top portions (2), medial portions (14) and bottom portions (3). While the Figures show a particular embodiment of the inventive support stand (1) having three support members (4); the invention is not so limited and embodiments of the inventive support stand (1) can include three support members, four support members, five support members, six support members, or more depending upon the application. The plurality of support members (4) can be produced from a wide variety of materials such as metal, plastic, wood, carbon fiber, fiberglass, or the like, or a combination thereof. The plurality of support members (4) can be solid or hollow having in cross section at a right angle to the longitudinal axis (15) which can be circular, triangular, square, rectangular, oval, or the like. Each of the plurality of support members (4) can be generally linear between a corresponding plurality of bottom ends (16) and the plurality of support elements (8).

A support member pivot (5) can couple the plurality of medial portions (14) in pivotal relation to permit spreading of the corresponding plurality of top portions (2) and plurality of bottom portions (3) of the plurality of support members (4) from a folded condition (6) (shown in broken lines in FIG. 2) into a supporting condition (7). As shown in the Figures, one non-limiting embodiment of the support member pivot (5) used to dispose three support members (4) in pivotal relation can provide a pair of elongate pivot elements (17)(18). The first of the pair of elongate pivots (17) can pivotally couple the medial portions (14) of a corresponding pair of the plurality of support members (19)(20). The second of the pair of elongate pivots (18) can pivotally couple the medial portion (14) of the third of the three support members (21) to the medial portion (14) of a first one of the pair of the plurality of support members (4) coupled in pivotal relation by the first of the pair of elongate pivots (17). Understandably, any configuration of a support member pivot (5) which couples the plurality of members (4) in pivotal relation and operates to permit spreading of the plurality of top portions (2) and the plurality of bottom portions (3), as above described, can be used with embodiments of the invention.

Now referring primarily to FIGS. 3 through 6, each of the plurality of top portions (2) can be configured, by indentation of the external surface (22) of each of the plurality of top portions (2) or otherwise, to provide a corresponding plurality of support elements (8) which inwardly face in the supporting condition (7) of the collapsible support structure (1). Each of the plurality of support elements (8) can be adapted to supportingly engage a corresponding part of a container (9), as above described. The non-limiting examples of FIGS. 3 through 6 show a non-limiting embodiment of the plurality of top portions (2) produced from a cylindrical tube (23). The wall (24) of the cylindrical tube (23) can upon forcible urging be inwardly indented to produce in one piece a top portion (2) having a support element (8) with a ledge element (25). The ledge element (25) can have sufficient area to engage a part of a container (9) received into the support element (8)(see for example FIG. 7). Understandably, the plurality of support elements (8) can be provided as separate pieces which can be joined to the external surface (22) each of the plurality of top portions (2).

Again referring primarily to FIGS. 3 through 6, particular embodiments of the plurality of top portions (2) can further provide a corresponding plurality of terminal portions (26) which extend a distance beyond a corresponding one of the plurality of support elements (8). The plurality of terminal portions (26) can be angled in relation to the corresponding plurality of top portions (2) such that the external surface (27) of one or more of the plurality of terminal portions (26) engages the corresponding part of the external surface (11) of a container (9) when engaged by the plurality support elements (8), as above-described. As shown by the non-limiting example of FIG. 1, certain embodiments of the plurality of terminal portions (26) can be angled in relation to the plurality of top portions (2) to engage the external surface (11) of containers (9) having substantially cylindrical configuration; however, the invention is not so limited and the plurality of terminal portions can be configured to engage corresponding part of the external surface (11) of a generally cylindrical container, a triangular container, a square container, a pentagonal container, a hexagonal container, or the like, or even irregularly shaped containers.

Now referring primarily to FIGS. 2 through 7, a restraint element (10) can be coupled to the plurality of support members (4) to prevent spreading of the plurality of top portions (2) and the plurality of bottom portions (3) beyond the supporting condition (7). While the Figures show the restraint element (10) coupled about the plurality of top portions (2) above the support element (8); the invention is not so limited, and the restraint element (10) can be coupled to the bottom portions (3) or about the medial portions (14) depending upon the application.

Again referring primarily to FIG. 2, certain embodiments of the restraint element (10) can form a loop about the plurality of top portions (2) at a location above each of said plurality of support elements (8). The restraint element (10) looped about the plurality of top portions (2) in the supporting condition (7) can engage the bottom (29) of the container (9) inserted inside of said plurality of top portions (2) of said collapsible support (1). The restraint element (10) can sufficiently flex to allow receipt of the container (9) by the plurality of support elements (8) as shown in the Figure. As to certain embodiments, the restraint element (10) can in the supporting condition (7) of the collapsible support (1) operate upon flexure to allow receipt of the container (9) by the plurality of support elements (8) and further operate to draw the plurality of top portions (2) sufficiently inward to engage an external surface (11) of the container (9).

Again referring primarily to FIG. 1, embodiments can further provide a plurality of bottom portions (3) which include a length adjustment element (30) to allow variable adjustment of the length of the plurality of bottom portions (3). One non-limiting example of the length adjustment element (30) provides a plurality of telescoping bottom portions (31) with a bullet catch (32) which allows operation of each of said plurality of bottom portions (3) between an extended condition (33) of selectable variable length and a retracted condition (34) (shown in broken line).

As can be easily understood from the foregoing, the basic concepts of the present invention may be embodied in a variety of ways. The invention involves numerous and varied embodiments of a collapsible support stand and methods for supporting a container, including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "a pivot" should be understood to encompass disclosure of the act of "pivoting"—whether explicitly discussed or not—and, conversely, were there effectively disclosure of the act of "pivoting", such a disclosure should be understood to encompass disclosure of "a pivot" and even a "means for pivoting." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the collapsible support stands herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A collapsible support, comprising:
 a) a plurality of support members having corresponding plurality of top portions, medial portions and bottom portions, each of said plurality of top portions having one of a corresponding plurality of support elements adapted to support a container;
 b) a support member pivot which disposes medial portions of said plurality of support members in pivotal relation to permit spreading of a corresponding plurality of top portions and plurality of bottom portions of said support members from a folded condition into a support condition in which said plurality of support elements inwardly face to receive said container; and
 c) a restraint element which forms a loop about said plurality of top portions at a location above each of said plurality of support elements to prevent spreading of said plurality of top portions and said plurality of bottom portions beyond said supporting condition.

2. The collapsible support of claim 1, wherein said restraint element in said supporting condition of said collapsible support has sufficient flexure to allow receipt of said container by said plurality of support elements.

3. The collapsible support of claim 2, wherein said restraint element in said supporting condition of said collapsible support operates upon flexure to allow receipt of said container by said plurality of support elements to draw said plurality of top portions sufficiently inward to engage an external surface of said container.

4. The collapsible support of claim 3, further comprising a container which engages said restraint element in said supporting condition, said restraint element having sufficient flexure to allow receipt of said container by said plurality of support elements.

5. The collapsible support of claim 4, wherein said plurality of support members comprise three support members and wherein said container comprises a cylindrical container.

6. The collapsible support of claim 4, wherein said plurality of bottom portions of said plurality of support members each include a length adjustment element.

7. The collapsible support of claim 6, wherein said length adjustment element comprise a plurality of telescoping bottom portions which allow operation of each of said plurality of bottom portions between an extended condition of selectable variable length and a retracted condition.

8. The collapsible support of claim 4, wherein said plurality of support members comprises three support members, and wherein said support member pivot comprises a pair of elongate pivot elements, and wherein a first of said pair of elongate pivots pivotally couples said medial portions of a corresponding pair of said plurality of support members, and wherein a second of said pair of elongate pivots pivotally couples said medial portion of a third of said three support members to said medial portion of a first one of said pair of said plurality of support members.

9. The collapsible support of claim 4, wherein said plurality of top portions of said plurality of support members has a corresponding plurality of terminal portions which extends a distance beyond a corresponding one of said plurality of support elements, each of said plurality of terminal portions having an external surface adapted to engage said external surface of said container received within said plurality of support elements.

10. A method of producing a collapsible support, comprising:
 a) providing a plurality of support members having a corresponding plurality of top portions, medial portions, and bottom portions;
 b) pivotally joining medial portions of said plurality of support members to permit spreading of said plurality of top portions and said plurality of bottom portions of said support members from a folded condition into a support condition;
 c) joining to each of said plurality of top portions to one of a corresponding plurality of support elements which inwardly face, said plurality of support elements adapted to support a container; and
 d) looping a restraint element about said plurality of support members at a location above said plurality of support elements to prevent spreading of said plurality of top portions and said plurality of bottom portions beyond said support condition.

11. The method of producing a collapsible support of claim 10, further comprising: providing said restraint element in said supporting condition of said collapsible support with sufficient flexure to allow receipt of said container by said plurality of support elements.

12. The method of producing a collapsible support of claim 11, further comprising: providing said three support members each indented to provide said plurality of support elements which inwardly face adapted to support a cylindrical container.

13. The method of producing a collapsible support of claim 11, further comprising: providing a length adjustment element in each of said plurality of bottom portions of said plurality of support members.

14. The method of producing a collapsible support of claim 13, wherein providing said length adjustment element comprising providing a telescoping bottom portion in each of said plurality of bottom portions of said plurality of support members.

15. The method of producing a collapsible support of claim 14, further comprising: joining a terminal portion to each of said plurality of support members, said terminal portion extending a distance beyond a corresponding one of said plurality of support elements, each of said plurality of terminal portions having an external surface adapted to engage said external surface of said container received within said plurality of support elements.

16. The method of producing a collapsible support of claim 14, wherein providing said plurality of support members comprises providing three support members, and wherein pivotally joining medical portions of said plurality of support members comprises pivotally coupling said medical portions of a first one and a second one of said three support members with a first one of a pair of pivot elements, and further comprising pivotally coupling said medial portions of said first one and a third one of said three support members with a second one of said pair of pivot elements.

* * * * *